Patented Apr. 30, 1946

2,399,489

UNITED STATES PATENT OFFICE 2,399,489

COATING COMPOSITIONS FOR PAPER AND THE LIKE

Chester G. Landes, New Canaan, Conn., assignor to American Cyanamid Company, New York, N. Y., a corporation of Maine No Drawing. Application October 6, 1943, Serial No. 505,163

10 Claims. (Cl. 260—9)

This invention relates to pigmented coating compositions particularly useful in coating paper and similar water-laid fibrous products. The invention includes the novel compositions, paper coated therewith and the process of applying them.

Paper and similar water-laid fibrous products, such as paper board, are frequently coated during or after manufacture with pigmented coating compositions to improve the appearance and printing qualities of the product. Most of the coating compositions commonly employed are composed of a mineral pigment, usually clay, and a binder. The binding material in such coating compositions may be any one or more of several suitable adhesive materials such as converted starches, gums, casein, glue, synthetic resins and the like. Of these, the starches are by far the cheapest adhesive materials.

Although paper products which have been coated with starch-bound coating compositions have a satisfactory appearance, the coating is lacking in other qualities, particularly water resistance. Poor water resistance of a coated sheet is evidenced by the ease with which the coating material is rubbed off when moistened with water. Handling of the coating paper by workmen, or others, with moist hands is often sufficient to remove part of the coating and ruin its appearance.

Since one of the objects of coating paper and board is to improve its printing qualities, it is evident that the coating should be resistant to the various operations of the printing process. One common printing process, called the off-set process, involves the application of water to the printing rolls. When paper coated with coating compositions employing starch as the binder is used in the off-set printing press a great deal of difficulty is encountered because of the poor water resistance of the coating. The pigment becomes loosened by the water, comes off and soon builds up deposits on parts of the printing press which seriously affect its operation. It has also been found that paper coated with starch-bound coating compositions has a pronounced tendency to curl and this seriously affects the printability of the coated paper and the ease with which it is handled in subsequent converting and packaging operations. Attempts have been made, therefore, to modify or supplement starches for use as binding agents in pigmented coating compositions. One such attempt has involved the use of urea-formaldehyde condensation products in conjunction with converted starches, the hope being that the resin would improve the water resistance of the coating.

Representative of such attempts to use synthetic resins to water-proof starch is the following: A slurry of pigments consisting of 40% English coating clay, 30% of high-finish domestic clay and 30% of titanium dioxide was dispersed in water to a solids content of 54.5% with the aid of 0.2% of trisodium phosphate as dispersing agent. A solution of starch was prepared by cooking oxidized corn starch with water so that the final solution contained 2.06 lbs of starch per gallon in solution. After cooling the starch solution it was mixed with the pigment slurry in such proportions that the final mixture contained 31% of starch based on the dry weight of the pigments. The composition had a pH of 8.5.

The coating composition just described was screened and a solution of a water-soluble urea-formaldehyde condensation product containing 70% resin solids was added thereto in such amounts that the final composition contained, on a dry basis, 20% as much resin as there was starch. Ammonium chloride amounting to 15% of the weight of the resin was then added to the mixture to act as curing catalyst for the resin. Upon addition of the ammonium chloride the coating composition thickened slightly and more water was added to reduce it to a viscosity suitable for application to paper. The final coating composition had a pH of 7.5.

The coating composition just described was applied by means of a conventional brush type coater to the liner of a single lined box board stock. The coated board was dried on a festoon drier for three minutes at 120° F. and was then super calendered. When tested, the coated board was found to have but a slightly better wet rub resistance than a similar board coated with the same starch-pigment composition without the resin. The water resistance of the board was, however, not nearly as good as that of a board which had been coated with a composition employing casein as binding agent.

Upon investigating the various causes of the failure of the urea-formaldehyde resin to improve the water resistance of the coated board, it was discovered that the probable reason was insufficient curing of the resin. As will be noted from the above the pH of the final coating composition was 7.5. Urea-formaldehyde condensation products require an acid type curing catalyst if they are to be polymerized to a water insoluble condition at the temperatures and in the time available when using equipment found in paper and board mills.

Unfortunately, coating compositions containing clay as pigment must be dispersed to reduce their viscosity so that the coating composition can be applied to the paper with ordinary coating devices at a high solids content so that a uniform, opaque coating is deposited. Most of the dispersing agents in use for this purpose are strongly alkaline, such as for example soda ash, trisodium phosphate, sodium silicate, etc. Obviously, coating compositions dispersed with such materials have an alkaline reaction and acid curing resins of the urea-formaldehyde and melamine-formaldehyde type can not be successfully used therewith to provide increased water resistance.

While investigating this matter still further it was discovered that certain alkali metal polyphosphates could be used, even those that have an alkaline reaction, to disperse clay coating compositions at a final pH of less than 7. Surprisingly, these alkali metal polyphosphates were found to be far more effective as dispersing agents for the clay coating compositions than the strongly alkaline dispersing agents commonly used.

To demonstrate the effect of the alkali metal polyphosphates as dispersing agents for clay containing coating compositions a series of tests was made in which a clay coating composition was dispersed with various dispersing agents using 0.2% by weight of the dispersing agent based on the weight of the dry pigments. The results of these tests are shown in the following table. The clay coating composition without any dispersing agent had a pH of 5.2 and a viscosity too high to measure. After the addition of dispersing agent to various samples of the clay composition the mixture was stirred for 60 minutes at room temperature and the viscosity of the dispersion measured with a Stormer type viscosimeter using a 500 g. weight. The results were as follows:

*Table I*

| Dispersing agent—0.2% | Viscosity | pH |
|---|---|---|
| | Seconds | |
| None | | 5.2 |
| Orthophosphoric acid | 1,895 | 3.2 |
| Monosodium orthophosphate | 2,562 | 4.8 |
| Trisodium phosphate | 1,132 | 6.8 |
| Methyl ammonium orthophosphate | +2,500 | 5.5 |
| Sodium carbonate | 313 | 8.1 |
| Disodium dihydrogen pyrophosphate | 7.6 | 4.6 |
| Tetrasodium pyrophosphate | 5.2 | 7.0 |
| Sodium hexametaphosphate | 4.9 | 6.2 |
| Sodium tetraphosphate | 7.2 | 6.0 |

As will be observed from the foregoing table, the alkali metal polyphosphates reduced the viscosity of the clay dispersion to a value sufficiently low for application to paper by conventional coating devices. At the same time the pH of the dispersion was kept on the acid side. The orthophosphates failed to reduce the viscosity of the dispersion to a value sufficiently low for application to paper. Sodium carbonate, commonly used as a dispersing agent, is shown to be less effective than the polyphosphates and to give an alkaline reaction to the coating composition.

Since it had been found that alkali metal polyphosphate could be used to disperse coating compositions to a low viscosity with a pH on the acid side, a mill trial was run using a coating composition dispersed with sodium tetraphosphate. In this trial the pigment consisted of 187 lbs. of English china clay, 187 lbs. of domestic coating clay and 112 lbs. of titanium dioxide dispersed in 589 lbs. of water with 2.19 lbs. of sodium tetraphosphate. The resulting dispersion had a pH of 6.0. 70 gallons of cooked starch containing 2 lbs. of starch per gallon of solution was then added to the clay dispersion. There was next added 27.7 lbs. (dry weight) of a urea-formaldehyde condensation product in the form of a 70% aqueous solution. Following this there was added 6.0 lbs. of ammonium chloride dissolved in 6 gallons of water and a small amount of a dye. The coating composition was then screened. It had a pH of 6.2 to 6.3 and contained about 33% bone dry solids.

The above described coating composition was applied to box board with a conventional brush type coater and the coating dried for 20 minutes at 125° F. The final product had a wet rub resistance equal to the wet rub resistance of a similar board coated with a composition using casein as binding agent. Printing tests by the letter press process disclosed that the board had excellent printability.

Although the coated board just described presented a satisfactory appearance, had good printability and a high wet rub resistance, it was subsequently found that when the same coating composition was applied to light weight paper, as for example label paper, it had a pronounced tendency to curl. This curling tendency was not as noticeable, however, as that of a paper of equal weight which had been coated with a coating composition employing starch as the sole binding agent. Upon further investigation of the problem it was discovered that the addition of a small amount of an acid-stable wax emulsion to the coating composition just described improved it particularly with respect to the curling tendencies of the coated sheet. Water resistance and printability were further improved. Other qualities such as gloss, opacity, reflectance, smoothness, etc., were not materially changed.

To demonstrate the advantages of acid-stable wax emulsions in coating compositions of the type described a series of mill trials was made on a directly comparative basis using coating compositions of the following compositions.

*Coating composition No. 1*

| | Pounds |
|---|---|
| Domestic coating clay | 1,200 |
| Sodium tetraphosphate | 5 |
| Casein | 180 |
| Water | 1,365 |

The clay was dispersed in 635 lbs. of water with the aid of the sodium tetraphosphate. The casein, dispersed in 730 lbs. of water with the aid of a small amount of ammonia and soda ash, was then added to the clay and the mixture stirred well and screened.

*Coating composition No. 2*

| | Pounds |
|---|---|
| Domestic coating clay | 1,200 |
| Sodium tetraphosphate | 5 |
| Enzyme converted starch | 300 |
| Water | 1,365 |

The clay was dispersed as before and the starch, dissolved in 730 lbs. of water, was added to it.

*Coating composition No. 3*

| | Pounds |
|---|---|
| Domestic coating clay | 1,200 |
| Sodium tetraphosphate | 5 |
| Enzyme treated starch | 300 |
| Water | 1,365 |
| Acid-stable wax emulsion, 50% solids | 60 |

This was the same as Composition No. 2 with the addition of an acid stable wax emulsion composed of crude scale wax, water and a gum as emulsifying agent.

*Coating composition No. 4*

| | Pounds |
|---|---|
| Domestic coating clay | 1,200 |
| Sodium tetraphosphate | 5 |
| Enzyme treated starch | 300 |
| Water | 1,365 |
| Acid-stable wax emulsion, 50% solids | 60 |
| Urea-formaldehyde polymer (dry basis) | 60 |
| Ammonium chloride | 9 |

This composition was the same as Composition No. 3 with the addition of a water-soluble urea-formaldehyde condensation product and a catalyst (ammonium chloride). As the acidic catalyst thickened the clay dispersion it was necessary to add ten more pounds of dispersing agent to thin it. The final composition had a pH of 6.6.

A 45 lbs. (25" x 38"—500) sulphite-soda stock was brush coated in the usual way with each of the above coating compositions. The coated papers were cured for 10 minutes at 70° C. and then supercalendered. The wet rub resistance of the various coated papers and their curling tendencies were then determined with the results shown in the following table. The values given for wet rub resistance are related to the amount of coating that is removed when a sample of the coated paper is rubbed with a wet swab under a standard pressure. The values represent the percent reflectance of a beam of light when impinged on a smear of the swab on black paper. The lower values are best. The curling tendency of the paper is indicated in terms of the number of degrees that a piece, 3" x 8", of the coated paper curled after a drop of read ink was spread in a streak longitudinally of the strip on its coated surface. As the ink dries the paper curls toward the coated side. These results are as follows:

*Table II*

| | Coating composition No. | | | |
|---|---|---|---|---|
| | 1 | 2 | 3 | 4 |
| Wet rub resistance per cent | 5.0 | 14.5 | 13.0 | 5.0 |
| Curl, when wet degrees | 30 | 155 | 59 | 20 |

As will be seen from the above the paper coated with the starch-bound coating composition, No. 2, had a very poor wet rub resistance and a high degree of curl. The paper treated with the coating composition containing starch and wax, No. 3, was only slightly better in wet rub resistance and was still unsatisfactory in degree of curling. The coating composition employing casein as binding agent, No. 1, showed an excellent degree of wet rub resistance and a low curl. The paper coated with the composition of the present invention, No. 4, had a wet rub resistance equal to that of a casein bound coating composition and had less tendency to curl when moistened with water. The paper coated with composition No. 4 was printed on an off-set press without trouble.

From the foregoing it will be seen that I am able to provide a coating on paper, board and analogous water-laid products which has a good appearance, excellent printability, a high wet rub resistance and a decreased tendency to curl. The new coating composition which makes these objects attainable comprises a dispersion of pigments having a pH of not more than 7 and containing a dispersed pigment material, a polyphosphate dispersing agent, and an acid-curing synthetic resin. Where still better printability and resistance to curl is required, the coating composition is further improved by the addition of wax.

The mineral pigment ordinarily used in my new coating composition is a good grade of high-finish coating clay. Other grades of domestic or imported coating clay may, of course, be used. Other pigments such as titanium dioxide, zirconium dioxide, zinc sulfide, lithopone, blanc fixé, etc., may also be used, alone or with clay, in the coating composition. The amount of pigment used may comprise about 50% to 90% of the weight of the total solids.

Pigmented coating compositions usually require the use of a dispersing agent to disperse the pigment and to thin the coating composition to a viscosity suitable for application to paper and paper board. As stated before materials such as trisodium phosphate, soda ash, sodium silicate, etc., have been used as dispersing agents but these materials are not suitable for use as dispersing agents in my coating composition because of their high alkalinity. On the other hand, polyphosphates such as the polymetaphosphates, disodium dihydrogen pyrophosphates, tetrasodium pyrophosphates, sodium tetraphosphate, and other alkali metal polyphosphates are excellent dispersing agents for use in my composition. The polyphosphoric acids may be used but they are, in general, too acidic for ordinary use. Even though some of these compounds, for example tetrasodium pyrophosphate, have an alkaline reaction many mineral pigments tend to be acidic in character and it is possible to prepare a coating composition having a pH below 7 with these polyphosphates as dispersing agents.

The amount of alkali metal polyphosphate employed by me may vary from about 0.01% to 2.0% depending upon the kind of pigment, its amount, viscosity desired, nature of the resin catalyst, etc. To illustrate the effects of varying amounts of a polyphosphate dispersing agent on the viscosity and pH of a coating composition, a pigment slurry was made up containing 40% English coating clay, 30% high finish domestic clay, and 30% of titanium dioxide. Water was added to give a pigment slurry having 50% by weight of pigment. Various amounts of sodium tetraphosphate were added to this slurry and after stirring for a few minutes its viscosity was determined with a Stormer type viscosimeter. The pigment slurry before addition of dispersing agent had a pH of 5.7 and a viscosity too high to measure. The results of this series of tests are shown in the following table.

*Table III*

| Dispersing agent | Per cent | pH | Viscosity |
|---|---|---|---|
| | | | Seconds |
| None | | 5.7 | |
| Sodium tetraphosphate | 0.05 | 5.9 | 1,452 |
| Do | 0.06 | 6.0 | 97.8 |
| Do | 0.07 | 6.1 | 20.0 |
| Do | 0.08 | 6.1 | 14.3 |
| Do | 0.09 | 6.2 | 12.7 |
| Do | 0.10 | 6.2 | 12.4 |
| Do | 0.2 | 6.6 | 7.2 |
| Trisodium phosphate | 0.2 | 7.4 | 948 |

Other alkali metal polyphosphates show similar effects in lowering the viscosity of clay dispersions.

Starches are employed by me in my novel coating composition to serve as adhesives, or binding agents, for the mineral pigment. Various kinds of starches and starch products such as boiled starch, enzyme treated starch, chlorinated starch, oxidized starch, acid and alkali hydrolyzed starch, dextrins, etc., may be employed. Such starch products may be derived from tapioca starch, corn starch, rice starch, potato starch, or other naturally occurring starches. The amount used will vary somewhat depending upon the adhesiveness of the particular starch product used, on the type of pigments employed, etc. Ordinarily from about 10% to 40% by weight of starch based on the weight of the pigment in the coating composition is employed.

As stated above starch adhesives are insufficiently water resistant to effectively bind pigments in coating compositions when the coated article is to be subjected to the action of water. Accordingly, therefore, I employ an acid curing resin to supplement the starch and to increase its resistance to water. Suitable acid curing resins that have been used by me are the carbamylamine-aldehyde and the triazinylamine-aldehyde condensation products. Among these may be mentioned the condensation products of an aldehyde such as formaldehyde, acetaldehyde, butyraldehyde, furfuraldehyde, etc., with carbamylamines such as urea, and thiourea or triazinylamines such as melamine, ammeline, ammelide, guanides, etc. Also suitable are the alkylated methylol ureas and alkylated methylol-melamines, etc. These condensation products are characterized by their ability to heat cure to a water insoluble condition at moderately low temperatures in the presence of acid catalysts. They may be used in either the partially polymerized or unpolymerized form. Ordinarily, I employ from about 5% to 50% by weight of the condensation product based on the weight of the starch in the coating composition.

Acidic curing catalysts for the resinous component of the coating composition are known to those skilled in the art and are used in amounts up to about 20% of the weight of the dry resin solids. Such acidic catalysts as ammonium chloride, ammonium sulfate, ammonium dihydrogen phosphate, maleic acid, phthalic acid, boric acid, etc., may be used. Of these, boric acid is particularly advantageous because it does not tend to thicken the coating composition when added thereto or to corrode the coating apparatus as do other acidic catalysts. Because of the acidic reaction of my coating composition it is not always necessary to use an acidic curing catalyst in the composition, however.

Further improvement in the coating composition may be had by the addition thereto of small amounts, for example, from about 2% to 50% by weight of the starch solids, of a wax size. Addition of such wax emulsions improves the printability of the coated sheet and further reduces its tendency to curl. Particularly suitable are those well known products of commerce known as acid-stable wax sizes. In general these consist of an aqueous dispersion of wax, generally a mineral wax such as crude scale wax, with or without the addition of modifying waxes such as montan wax, carnauba wax, candelilla wax, etc., and an emulsifying agent. Gums, such as gum karaya and gum arabic, glue, etc., are generally employed as emulsifying agents. These sizes resist precipitation by dilute acids and acidic salts.

The coating composition of the present invention may contain from about 20% to 65% of total solids, preferably from about 35 to 55%. The total solids in the composition will depend, of course, on the nature of the pigment, the dispersing agent and the type of coating apparatus used in its application. Since the resin in the composition must be cured to a water insoluble condition the coating composition must be acidic in reaction, preferably having a pH of from about 4.0 to 7.0.

The coating composition just described may be applied to paper stock of various weights suitable for the production of printing and label paper, identification tags, wall paper, insulation and wall board, box board and container board, flour bags, and the like. It may be applied by any of the known types of coating apparatus using brushes, knives, air jets, rolls, etc. The coating may be dried in the usual way although it is preferred that the coating be subjected to elevated temperatures for a sufficient time to cure the resin to a water insoluble condition. Accordingly, temperatures up to about 200° C., or higher if available, may be used. Ordinarily, a curing time of about 3 minutes at 70° C. is sufficient although a longer time, or higher temperature, or a longer heating time at a lower temperature may be used.

I claim:

1. A coating composition having a pH within the range 4.0 to 7.0 and having a total solids content of from about 20% to 65% by weight comprising a mineral pigment, an alkali metal polyphosphate dispersing agent, starch in amounts of from about 15% to 40% by weight of the dry weight of the pigments, a member of the group consisting of acid-curing urea-aldehyde and melamine-aldehyde condensation products in amounts of from 5% to 50% by weight of the weight of the starch and an acidic curing catalyst for said condensation product.

2. A coating composition having a pH within the range 4.0 to 7.0 and having a total solids content of from about 20% to 65% by weight comprising a mineral pigment, an alkali metal polyphosphate dispersing agent, starch in amounts of from about 15% to 40% by weight of the dry weight of the pigments, a member of the group consisting of acid-curing urea-aldehyde and melamine-aldehyde condensation products in amounts of from 5% to 50% by weight of the weight of the starch, and an acid stable wax size.

3. A coating composition having a pH within the range 4.0 to 7.0 and having a total solids content of from about 20% to 65% by weight comprising clay, an alkali metal polyphosphate dispersing agent, starch in amounts of from about 15% to 40% by weight of the dry weight of the pigments in the composition, a member of the group consisting of acid-curing urea-aldehyde and melamine-aldehyde condensation products in amounts of from 5% to 50% by weight of the weight of the starch, and an acid-reacting curing catalyst for said resin.

4. A coating composition having a pH within the range 4.0 to 7.0 and having a total solids content of from about 20% to 65% by weight comprising a mineral pigment, 0.01% to 2.0% by weight of the pigment of sodium tetraphosphate, starch in amounts of from about 15% to 40% by weight of the dry weight of the pigments, a member of the group consisting of acid-curing urea-aldehyde and melamine-aldehyde condensation products in amounts of from 5% to 50% by weight of the weight of the starch and an acid-reacting curing catalyst for said resin.

5. A coating composition having a pH within the range 4.0 to 7.0 and having a total solids content of from about 20% to 65% by weight comprising a mineral pigment, an alkali metal polyphosphate dispersing agent, starch in amounts of from 15% to about 40% by weight of the dry weight of the pigments, a urea-formaldehyde condensation product in amounts of from 5% to 50% by weight of the weight of the starch and an acid-reacting curing catalyst for said resin.

6. A coating composition having a pH within the range 4.0 to 7.0 and having a total solids content of from about 20% to 65% by weight comprising a mineral pigment, an alkali metal polyphosphate dispersing agent, starch in amounts of from 15% to about 40% by weight of the dry weight of the pigments, a melamine formaldehyde condensation product in amounts of from 5% to 50% by weight of the weight of the starch and an acid reacting curing catalyst for said resin.

7. A coating composition having a pH within the range 4.0 to 7.0 and having a total solids content of from about 20% to 65% by weight comprising a mineral pigment, an alkali metal polyphosphate dispersing agent, starch in amounts of from 15% to about 40% by weight of the dry weight of the pigments, a member of the group consisting of acid-curing urea-aldehyde and melamine-aldehyde condensation products in amounts of from 5% to 50% by weight of the weight of the starch and boric acid.

8. A coating composition having a pH within the range 4.0 to 7.0 and having a total solids content from about 20% to 65% by weight of which 50% to 90% by weight is a mineral pigment comprising clay, 0.01% to 2.0% by weight of the pigment of an alkali metal polyphosphate dispersing agent, starch in amounts of from 15% to about 40% by weight of the dry weight of the pigments in the composition, a water-soluble urea-formaldehyde condensation product in amounts from 5% to 50% by weight of the weight of the starch, an acid reacting curing catalyst for the urea-formaldehyde condensation product and an acid stable wax size in amounts of from about 2% to 50% by weight of the starch solids.

9. A water-laid cellulosic fibrous product coated with the composition of claim 1.

10. A coating composition having a pH within the range 4 to 7 and having a total solids content of about 33⅓% to 50% by weight comprising a mineral pigment, an alkali metal tetraphosphate dispersing agent, starch in amount from 20% to 40% of the weight of the pigment, urea-formaldehyde condensation product in amount from 10–40% by weight of the starch and an acidic curing catalyst for said condensation product.

CHESTER G. LANDES.